United States Patent
Naik et al.

(10) Patent No.: US 11,544,042 B1
(45) Date of Patent: Jan. 3, 2023

(54) DEPLOYING A RADIO ACCESS NETWORK CONTAINERIZED NETWORK FUNCTION (RAN CNF) THAT IS PORTABLE ACROSS A PLURALITY OF RAN HARDWARE PLATFORMS

(71) Applicant: Saankhya Labs Pvt. Ltd., Bangalore (IN)

(72) Inventors: Parag Naik, Bangalore (IN); Anindya Saha, Bangalore (IN); Sandeep Pendharkar, Bangalore (IN); Venugopal Kolathur, Bangalore (IN)

(73) Assignee: SAANKHYA LABS PVT. LTD., Bangalore (IN)

( * ) Notice: Subject to any disclaimer, the term of this patent is extended or adjusted under 35 U.S.C. 154(b) by 0 days.

(21) Appl. No.: 17/679,012

(22) Filed: Feb. 23, 2022

(30) Foreign Application Priority Data

Sep. 22, 2021 (IN) .............................. 202141042894

(51) Int. Cl.
  *G06F 9/44* (2018.01)
  *G06F 8/30* (2018.01)
  *G06F 8/60* (2018.01)
(52) U.S. Cl.
  CPC . *G06F 8/30* (2013.01); *G06F 8/60* (2013.01)
(58) Field of Classification Search
  None
  See application file for complete search history.

(56) References Cited

U.S. PATENT DOCUMENTS

| | | | |
|---|---|---|---|
| 9,992,064 B1* | 6/2018 | Chawla | H04L 41/082 |
| 11,233,708 B1* | 1/2022 | Bawcom | G06Q 10/0633 |
| 2015/0378717 A1* | 12/2015 | Jacob | H04L 67/34 717/124 |
| 2021/0294730 A1* | 9/2021 | Parees | G06F 8/20 |
| 2021/0303290 A1* | 9/2021 | Schmit | G06F 9/45558 |
| 2022/0138004 A1* | 5/2022 | Nandakumar | G06F 9/4881 718/102 |
| 2022/0147399 A1* | 5/2022 | Meier | G06F 8/41 |

* cited by examiner

Primary Examiner — Anna C Deng

(57) ABSTRACT

A system for deploying a Radio Access Network Containerized Network Function (RAN CNF) that is portable across a plurality of RAN hardware platforms is provided. The system includes a Software Development Kit (SDK), a schedule generator and a scheduler runtime unit. The SDK enables providing a RAN functionality in a physical layer (L1) software code in a platform-independent manner as a RAN pipeline of a plurality of RAN tasks. The RAN tasks include a first and second RAN task. The first RAN task invokes an Application programming interface (API) from a plurality of Application Programming Interfaces to call to the second RAN task. The schedule generator generates a schedule for allocating a node in the RAN pipeline to one or more processing elements. The scheduler runtime unit loads the RAN tasks corresponding to nodes in the RAN pipeline, based on the schedule generated by the schedule generator.

26 Claims, 10 Drawing Sheets

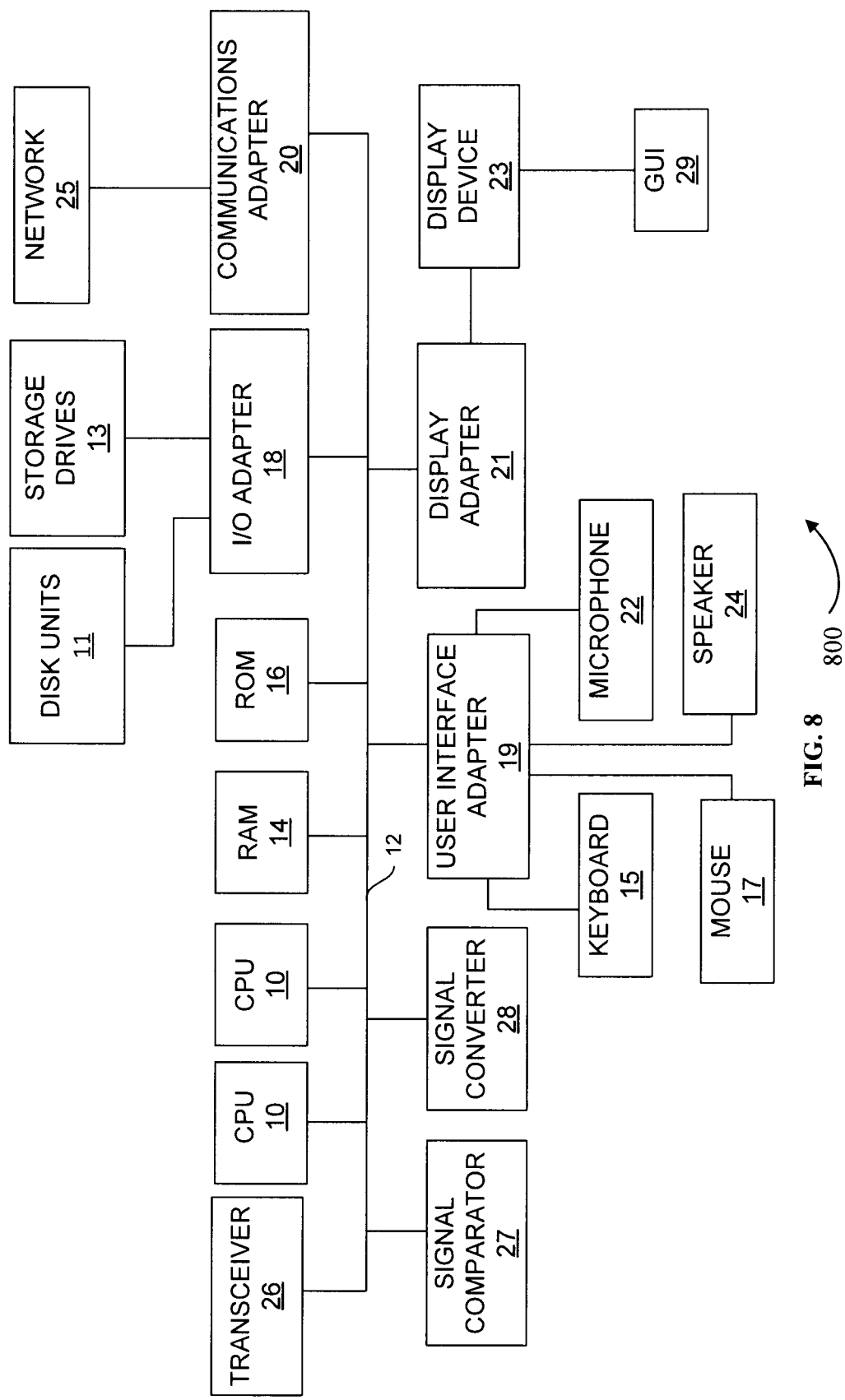

US 11,544,042 B1

DEPLOYING A RADIO ACCESS NETWORK CONTAINERIZED NETWORK FUNCTION (RAN CNF) THAT IS PORTABLE ACROSS A PLURALITY OF RAN HARDWARE PLATFORMS

BACKGROUND

Technical Field

The embodiments herein generally relate to portable Radio Access Network (RAN) development framework, and more particularly, to a system and method for developing and deploying a Radio Access Network Containerized Network Function (RAN CNF).

Description of the Related Art

In 5G networks, the disaggregation in the Distributed Units (DU) landscape has propelled the separation of the DU hardware and software. The DU High-physical layer has adopted a software-defined approach executing on Commercial Off-The-Shelf (COTS) hardware. This has resulted in a diverse ecosystem of DU Independent Software Vendors (ISV). But the independent hardware vendor (IHV) ecosystem is still very niche and results in vendor lock-in. Vendor lock-in is a critical issue in cloud computing because it is very difficult to move databases once they're set up, especially in a cloud migration, which involves moving data to a totally different type of environment and may involve reformatting the data. Also, once a third party's software is incorporated into a business's processes, the business may become dependent upon that software.

FIG. 1 is a block diagram of a representative example of a vendor lock-in DU L1 software developed on an X86 COTS platform using a conventional Software Development Kit provided by the platform vendor. The DU CNFs (L1 software) 108A-N are developed using a proprietary SDK APIs 102 that are very tightly coupled with an underlying X86 COTS platform 118 by means of a RAN Task Controller 114. This makes it virtually impossible to port the L1 software to another DU platform, thereby resulting in a vendor lock-in of the DU solution. The computing cores of the underlying platform are assigned to the L1 RAN tasks statically (often assuming worst-case bandwidth and throughput requirements). This results in the non-optimum utilization of the computing resources.

The majority of a COTS-based DU hardware 106 today is based on a hardware platform from a single vendor. However, this is likely to change as the new hardware architectures that are better optimized to run RAN workloads and reduce the total cost of ownership of a RAN infrastructure 104 become available from multiple vendors. This will force the current DU software vendors to maintain multiple software versions for multiple hardware platforms. True interchange of a DU ISV with a DU IHV can be possible only when the L1 DU software is truly "portable." Along with portability, dynamic and optimum utilization of the underlying computing resources is a highly desirable requirement as well.

Accordingly, there is a need to mitigate and/or overcome drawbacks associated with current systems and methods for the design and deployment of Radio Access Network Containerized Network Function (RAN CNF) to prevent lack of portability across DU hardware platforms.

SUMMARY

Embodiments herein provide a system for developing and deploying a Radio Access Network Containerized Network Function (RAN CNF) that is portable across one or more of RAN hardware platforms. The system includes a Software Development Kit (SDK), a schedule generator, and a scheduler runtime unit. The Software Development Kit (SDK) enables an expression of a RAN functionality in a physical layer (L1) software code in a platform-independent manner as a RAN pipeline of one or more RAN tasks that include at least a first RAN task, and a second RAN task that is to be executed next in order to the first RAN task. The first RAN task is developed as a function that invokes an Application programming interface (API) from one or more Application Programming Interfaces (APIs) to initiate a call to the second RAN task. The schedule generator is configured for generating a schedule for allocating at least one node in the RAN pipeline to at least one processing element in at least one RAN hardware platform selected from the one or more RAN hardware platforms. The scheduler runtime unit is configured for loading the one or more RAN tasks that correspond to nodes in the RAN pipeline that are allocated by the schedule generator, in the at least one processing element in the at least one RAN hardware platform that is selected from the one or more RAN hardware platforms based on the schedule generated by the schedule generator.

The system disclosed herein can be deployed on multiple DU platforms without any source code level changes. This enables the operators with the ability to plug in any new DU hardware without any vendor lock-in. The SDK enables modelling of the inherent domain behaviour in a platform independent manner. This in turn cases the timing constraints for individual nodes in DFG, reduces execution costs associated with the processing elements in the DU platform, and also reduces costs for data transfer from one processing element to another.

In some embodiments, the RAN pipeline includes a Data Flow Graph (DFG). In some embodiments, the system includes a developer tool configured for extracting the DFG from the physical layer (L1) software code and providing the DFG as an input to the schedule generator for scheduling the nodes of the DFG on the one or more processing elements of the target RAN hardware platform.

In some embodiments, the one or more APIs include (i) a rw_call_next function which specifies a next RAN task to be executed, (ii) a rw_wait_task function which allows a RAN task to be blocked until completion of another RAN task specified with a task_id from the rw_call_next function, and (iii) a rw_wait_task_all function which allows the RAN task to blocked until a plurality of sub-tasks are completed.

In some embodiments, the rw_call_next function is configured for obtaining a task_id of a RAN task to be executed by providing the RAN task's name as an argument along with a corresponding task argument structure. In some embodiments, the rw_call_next function is implemented using a Remote Procedure Call (RPC) mechanism to transfer messages between the one or more RAN tasks that are loaded on the one or more processing elements.

In some embodiments, the rw_call_next function is configured for obtaining a task_id of a RAN task to be executed by providing the RAN task's name as an argument along with a corresponding task argument structure. In some embodiments, the rw_call_next function is implemented using an Inter-process communication (IPC) mechanism to transfer messages between the one or more RAN tasks that are loaded on the one or more processing elements.

In some embodiments, the rw_call_next function is configured for obtaining the task_id of the RAN task to be executed by providing the RAN task's name as an argument along with a corresponding task argument structure. In some embodiments, the rw_call_next function is implemented using at least one thread or task or process execution model provided by the runtime environment such as a POSIX_thread execution model or a Linux/UNIX process execution model to execute the one or more RAN tasks that are loaded on the one or more processing elements.

In some embodiments, the rw_call_next function is configured for obtaining the task_id of the RAN task to be executed by providing the RAN task's name as an argument along with a corresponding task argument structure. In some embodiments, the rw_call_next function is custom implemented to transfer messages between the one or more RAN tasks that are loaded on the one or more processing elements.

In some embodiments, the rw_wait_task function is configured for queuing of one or more succeeding RAN tasks until execution of the RAN task corresponding to a task identifier, task_id is completed. In some embodiments, the rw_wait_task function is invoked during explicit dependencies between call_next function of the one or more RAN tasks.

In some embodiments, the rw_wait_task_all function is configured for blocking the plurality of succeeding tasks until execution of a pre-set number of RAN tasks is completed. In some embodiments, the task_id of each of the tasks in execution is passed in a second argument task_ids which is an array of task identifiers.

In some embodiments, the one or more APIs further include a rw_alloc_task_arg function that enables the code developer to create an argument structure rw_task_arg for any task that will be invoked using the rw_call_next function. In some embodiments, the argument structure rw_task_arg includes metadata required by the developer tool to manage the one or more RAN tasks and a pointer to the actual data being processing in the RAN task.

In some embodiments, the one or more APIs include a rw_get_arg_ptr (rw_task_arg *t_ptr) function that enables the code developer to extract data from the argument structure, rw_task_arg, to be processed by the one or more RAN tasks and a rw_get_caller_task_id(rw_task_arg *t_arg) function that enables retrieval of task id of the RAN task that received arg as an argument.

In some embodiments, the system includes a Hardware Architecture Description (HWAD) file for providing a description of the at least one processing element for provisioning computing resources for execution of the RAN tasks in the DFG in a platform independent manner.

In some embodiments, the system includes a User Interface (UI) module configured for invoking the schedule generator to schedule the tasks corresponding to network functions on the at least one processing element. In some embodiments, the UI module includes a first window that includes the DFG and a second window that includes a schedule of the tasks.

In one aspect, a method for developing and deploying a Radio Access Network Containerized Network Function (RAN CNF) that is portable across one or more RAN hardware platforms is provided. The method includes enabling, by a Software Development Kit (SDK), an expression of a RAN functionality in a physical layer (L1) software code in a platform independent manner as a RAN pipeline of one or more RAN tasks that include at least a first RAN task, and a second RAN task that is to be executed next in order to the first RAN task. The first RAN task is developed as a function that invokes an Application programming interface (API) from one or more Application Programming Interfaces (APIs) to initiate a call to the second RAN task.

The method includes generating, by a schedule generator, a schedule for allocating at least one node in the RAN pipeline to at least one processing element in at least one RAN hardware platform selected from the one or more RAN hardware platforms. The method includes loading, by a scheduler runtime unit, the one or more RAN tasks that correspond to nodes in the RAN pipeline that are allocated by the schedule generator, in the at least one processing element in the at least one RAN hardware platform that is selected from the one or more RAN hardware platforms based on the schedule generated by the schedule generator.

The method herein enables decoupling of DU hardware and DU software to ensure that there is no vendor lock-in and facilitates portability of the DU's L1 physical software codes across multiple hardware platforms.

In some embodiments, the RAN pipeline includes a Data Flow Graph (DFG). The method includes providing a developer tool configured for extracting the DFG from the physical layer (L1) software code and providing the DFG as an input to the schedule generator for scheduling the nodes of the DFG on the one or more processing elements of the target RAN hardware platform.

In some embodiments, the one or more APIs include a rw_call_next function which specifies a next RAN task to be executed, a rw_wait_task function which allows a RAN task to be blocked until completion of another RAN task specified with a task_id from a rw_call_next function, and a rw_wait_task_all function which allows the RAN task to blocked until one or more sub-tasks are completed.

In some embodiments, the rw_call_next function is configured for obtaining a task_id of a RAN task to be executed by providing the RAN task's name as an argument along with a corresponding task argument structure. In some embodiments, the rw_call_next function is implemented using a Remote Procedure Call (RPC) mechanism to transfer messages between the one or more RAN tasks that are loaded on the one or more processing elements.

In some embodiments, the rw_call_next function is configured for obtaining a task_id of a RAN task to be executed by providing the RAN task's name as an argument along with a corresponding task argument structure. In some embodiments, the rw_call_next function is implemented using an Inter-process communication (IPC) mechanism to transfer messages between the one or more RAN tasks that are loaded on the one or more processing elements.

In some embodiments, the rw_call_next function is configured for obtaining the task_id of the RAN task to be executed by providing the RAN task's name as an argument along with a corresponding task argument structure. In some embodiments, the rw_call_next function is implemented using at least one thread or task or process execution model provided by the runtime environment such as a POSIX_thread execution model or a Linux/UNIX process execution model to execute the one or more RAN tasks that are loaded on the one or more processing elements.

In some embodiments, the rw_call_next function is configured for obtaining the task_id of the RAN task to be executed by providing the RAN task's name as an argument along with a corresponding task argument structure. In some embodiments, the rw_call_next function is custom implemented to transfer messages between the one or more RAN tasks that are loaded on the one or more processing elements.

In some embodiments, rw_wait_task function is configured for queuing of one or more succeeding RAN tasks until execution of the RAN task corresponding to a task identifier, task_id is completed. In some embodiments, the rw_ wait_task function is invoked during explicit dependencies between call_next function of the one or more RAN tasks.

In some embodiments, the rw_wait_task_all function is configured for blocking the one or more succeeding tasks until execution of a pre-set number of RAN tasks is completed. In some embodiments, the task_id of each of the tasks in execution is passed in a second argument task_ids which is an array of task identifiers.

In some embodiments, the one or more APIs further include a rw_alloc_task_arg function that enables the code developer to create an argument structure rw_task_arg for any task that will be invoked using the rw_call_next function. In some embodiments the argument structure rw_task_arg includes metadata required by the developer tool to manage the plurality of RAN tasks and a pointer to the actual data being processing in the RAN task.

In some embodiments, the one or more APIs further include a rw_get_arg_ptr (rw_task_arg *t_ptr) function that enables the code developer to extract data from the argument structure, rw_task_arg, to be processed by the one or more RAN tasks and a rw_get_caller_task_id (rw_task_arg *t_arg) function that enables retrieval of task id of the RAN task invoked using the rw_call_next function.

In some embodiments, the method includes providing a Hardware Architecture Description (HWAD) file configured for providing a description of the at least one processing element for provisioning computing resources for execution of the RAN tasks in the DFG in a platform-independent manner.

In some embodiments, the method includes the step of providing a User Interface (UI) module configured for invoking the schedule generator to schedule the tasks corresponding to network functions on the at least one processing element. In some embodiments, the UI module includes a first window that includes the DFG and a second window that includes a schedule of the tasks.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 8 is a schematic diagram of a computer architecture in accordance with the embodiments herein.

DETAILED DESCRIPTION OF THE DRAWINGS

Figure 1:
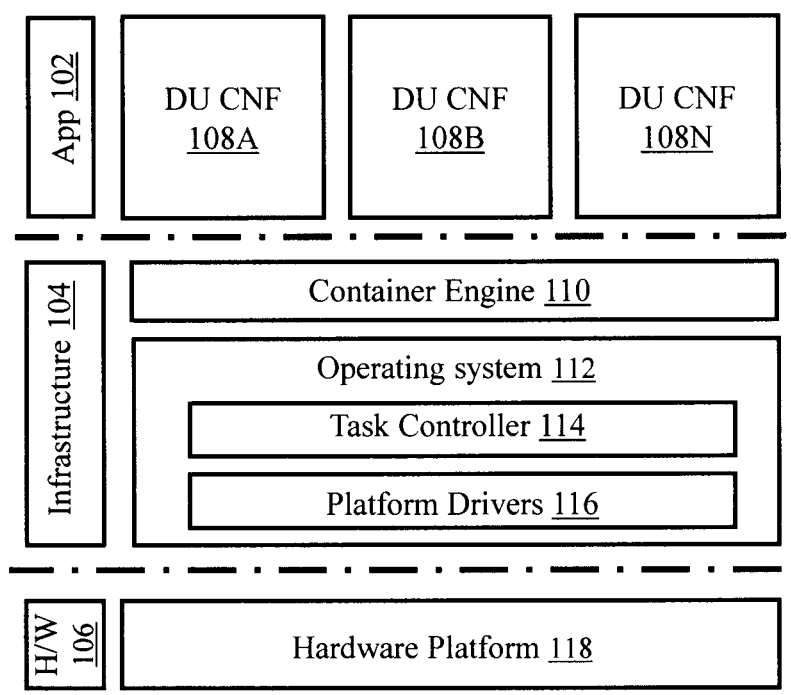
FIG. 1 is a block diagram illustrating deployment of Radio Access Network Containerized Network Functions (RAN CNFs) across multiple DU hardware platforms, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method to enable deployment of Radio Access Network CNFs (RAN) across multiple DU hardware platforms without any source code changes. Referring now to the drawings, and more particularly to FIGS. 2 through 8, where similar reference characters denote corresponding features consistently throughout the figures, there are shown preferred embodiments.

Figure 2:
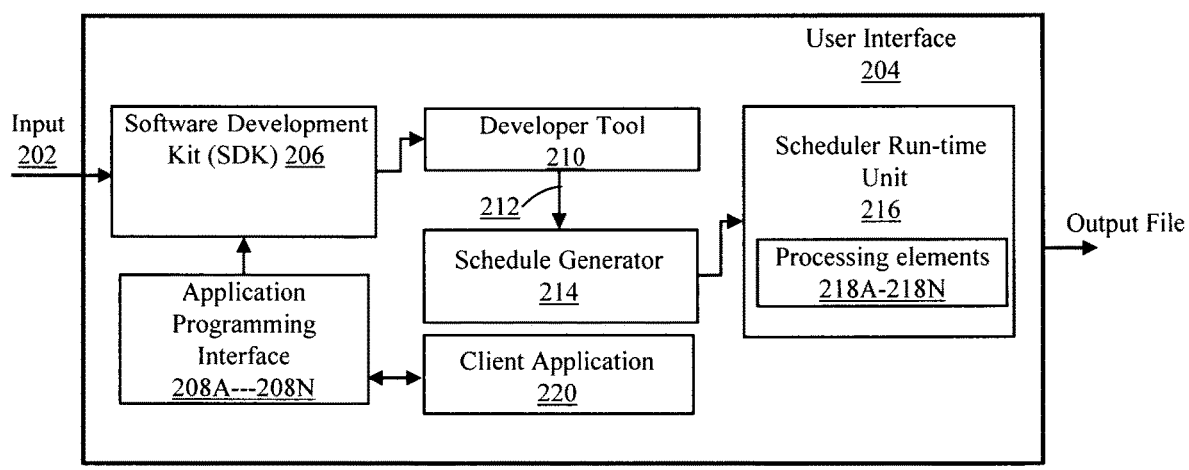
FIG. 2 is block diagram illustrating a system for deploying a Radio Access Network Containerized Network Function (RAN CNF) that is portable across one or more RAN hardware platforms, according to some embodiments herein.

FIG. 2 is a block diagram illustrating a system for deploying a Radio Access Network Containerized Network Function (RAN CNF) that is portable across one or more RAN hardware platforms, according to some embodiments herein. The system includes a user interface 204 executed on a CNF manager for deployment of a L1 physical software as well as visualization of performance, memory utilization, and various other metrics gathered by a RAN monitor during the execution of the L1 physical software. The user interface 204 includes a Software Development Kit (SDK) 206, a schedule generator 214, and a scheduler runtime unit 216.

The Software Development Kit (SDK) 206 is configured to enable an expression of a RAN functionality in a physical layer (L1) software code in a platform-independent manner. The SDK includes an API library having one or more Application Programming Interfaces (APIs) 208A-N used by the developers to develop the RAN waveform that constitutes the L1 software based on an input 202 provided by the developers. In some embodiments, a user can interact with the system using the one or more APIs 208A-208N offered by a client application 220. The client application 220 is configured to present an output at the user end.

The RAN functionality herein is provided as a RAN pipeline of one or more RAN tasks that include at least a first RAN task, and a second RAN task that is to be executed next in order to the first RAN task. The first RAN task is developed as a function that invokes an Application programming interface (API) from the one or more Application Programming Interfaces (APIs) 208A-N to initiate a call to the second RAN task. The schedule generator 214 generates a schedule for allocating at least one node in the RAN pipeline to one or more processing elements 218A-N in at least one RAN hardware platform selected from the one or more RAN hardware platforms. The scheduler runtime unit 216 loads the one or more RAN tasks that correspond to nodes in the RAN pipeline that are allocated by the schedule generator 214 in the one or more processing elements 218A-N in the at least one RAN hardware platform that is selected from the one or more RAN hardware platforms based on the schedule generated by the schedule generator 214. Here the RAN pipeline includes a Data Flow Graph (DFG) 212.

In some embodiments, a developer tool 210 that extracts the DFG 212 from the physical layer (L1) software code and provides the DFG 212 as an input to the schedule generator 214. The schedule generator 214 then schedules the nodes of the DFG 212 on the one or more processing elements of the target RAN hardware platform. In some embodiments, the one or more APIs 208A-N in the API library includes, but not limited to, a rw_call_next function that specifies a next RAN task to be executed, a rw_wait_task function that allows a RAN task to be blocked until completion of another RAN task specified in the rw_call_next function and a rw_wait_task_all function which allows the RAN task to blocked until one or more sub-tasks are completed.

In some embodiments, the rw_call_next function obtains a task_id of a RAN task to be executed by providing the RAN task's name as an argument along with a corresponding task argument structure. Here the rw_call_next function is implemented using a Remote Procedure Call (RPC) mechanism to transfer messages between the one or more RAN tasks that are loaded on the one or more processing elements 218A-N. In some embodiments, the rw_call_next function obtains a task_id of a RAN task to be executed by providing the RAN task's name as an argument along with a corresponding task argument structure. In some embodiments, the rw_call_next function herein is implemented using an Inter-process communication (IPC) mechanism to transfer messages between the one or more RAN tasks that are loaded on the one or more processing elements 218A-N.

In some embodiments, rw_call_next function is configured for obtaining the task_id of the RAN task to be executed by providing the RAN task's name as an argument along with a corresponding task argument structure. In some embodiments, the rw_call_next function is implemented using at least one thread or task or process execution model provided by the runtime environment such as a POSIX_thread execution model or a Linux/UNIX process execution model to execute the RAN tasks and to synchronize the one or more RAN tasks that are loaded on the one or more processing elements 218A-N.

In some embodiments, the rw_call_next function obtains the task_id of the RAN task to be executed by providing the RAN task's name as an argument along with a corresponding task argument structure. In some embodiments, the rw_call_next function is implemented to transfer messages between the one or more RAN tasks that are loaded on the one or more processing elements 218A-N. In some embodiments, the rw_wait_task function queues up one or more succeeding RAN tasks in the RAN until execution of the RAN task corresponding to a task identifier, task_id is completed. The rw_wait_task function herein is invoked during explicit dependencies between call_next function of one or more RAN tasks. In some embodiments, the rw_wait_task_all function blocks the one or more succeeding tasks until execution of a pre-set number of RAN tasks is completed. The task_id of each of the tasks in execution is passed in a second argument task_ids which is an array of task identifiers.

In some embodiments, the one or more APIs 208A-N further includes a rw_alloc_task_arg function that enables the code developer to create an argument structure rw_task_arg for any task that will be invoked using the rw_call_next function. The argument structure rw_task_arg includes metadata required by the developer tool 210 to manage the one or more RAN tasks and a pointer to the actual data being processing in the RAN task. In some embodiments, the one or more APIs 208A-N further includes a rw_get_arg_ptr (rw_task_arg *t_ptr) function that enables the code developer to extract data from the argument structure, rw_task_arg, to be processed by the one or more RAN tasks and a rw_get_caller_task_id(rw_task_arg *t_arg) function that enables retrieval of task id of the RAN task that received arg as an argument.

In some embodiments, UI module 204 is configured to invoke the schedule generator 214 to schedule the tasks corresponding to network functions on the one or more processing elements 218A-N. The UI module 204 includes a first window that includes the DFG 212 and a second window that includes a schedule of the tasks.

In some embodiments, a Hardware Architecture Description (HWAD) file provides a description of the one or more processing elements 218A-N for provisioning computing resources for execution of the RAN tasks in the DFG 212 in a platform-independent manner.

Figure 3A:
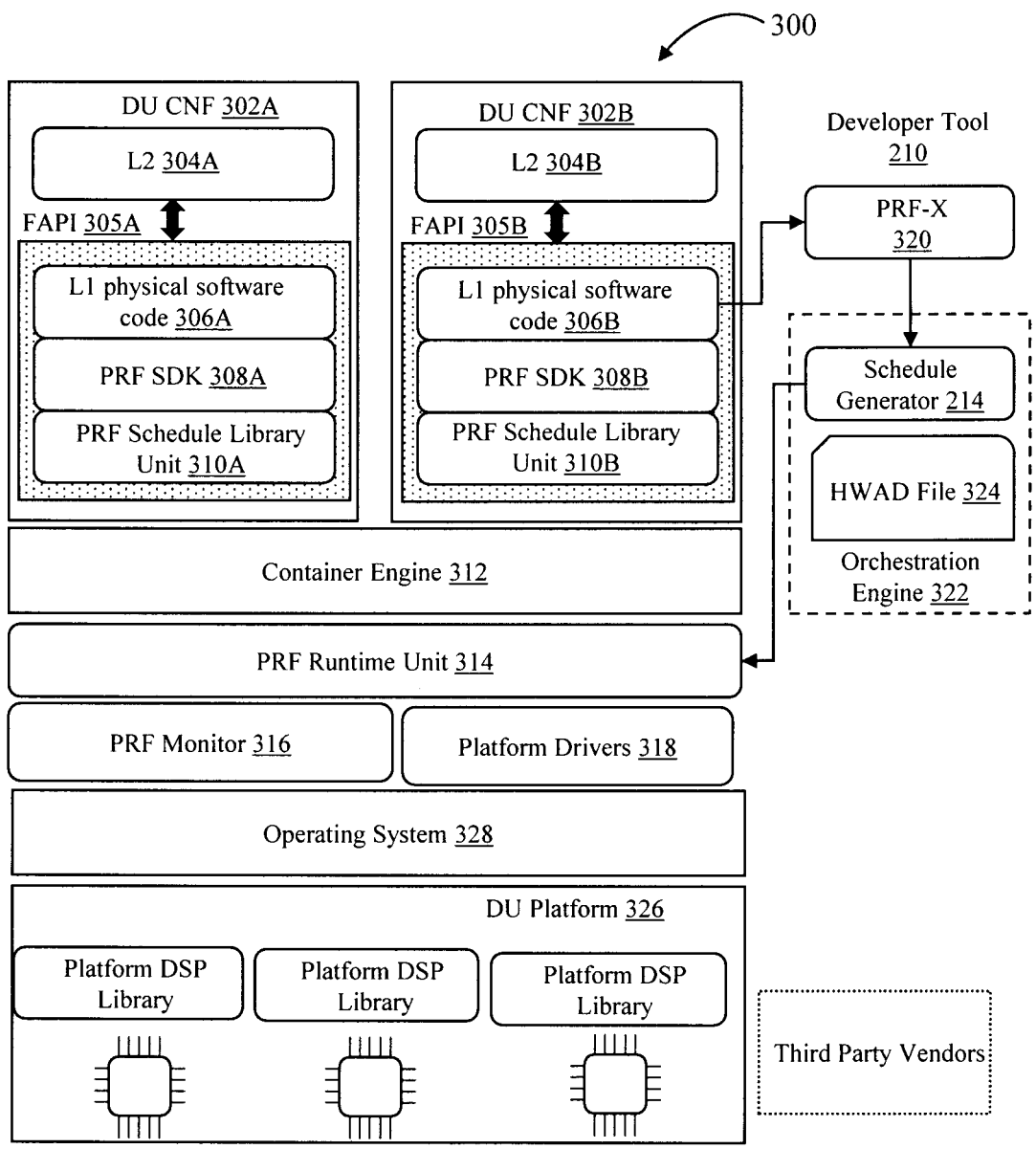
FIG. 3A is a block diagram illustrating various components of a portable RAN framework, according to some embodiments herein.

FIG. 3 is a block diagram illustrating various components of a portable RAN framework 300, according to some embodiments herein. The portable RAN framework 300 includes Distributed Units Containerized Network Functions (DU CNFs) 302A-B, layers (L2) 304A-B, Functional Application Platform Interfaces (FAPIs) 305A-B, a container engine 312, a Portable RAN Framework (PRF) runtime unit 314, the developer tool 210, the schedule generator 214, a hardware architecture description file 324, a Portable RAN Framework (PRF) Monitor 316, a run-time unit 218, and one or more platform drivers 318 required for the operating system 328 to communicate with the DU accelerator platform 326. The FAPIs 305A-B include L1 physical software code 306A-B, Portable RAN Framework software developing kits (PRF SDKs) 308A-B and Portable RAN Framework (PRF) schedule library units 310A-B.

In some embodiments, the PRF schedule library units 310A-B includes one or more Application programming Interfaces (APIs) library that is used by the software developers to develop platform independent Distributed Units L1 physical software codes 306A-B. The API library includes one or more API functions that allow developers to express the L1 physical software codes 306A-B as the dataflow graph (DFG) 212 of the RAN Tasks. Each RAN task is developed as a C function with a "call next" to the next task in the pipeline. In some embodiments, a PRF-X 320 that extracts the Data flow Graph (DFG) 212 from the L1 physical software codes 306A-B. The schedule generator 214 schedules the DFG 212 on the processing elements of the DU platform 326. The HWAD file 324 provides an abstraction of the underlying hardware details such as processing elements, memory hierarchies and the like. The PRF Schedule Library units 310A-B are configured to link with the L1 physical software codes 306A-B and loads RAN tasks as per the schedule generated by the schedule generator 214. The PRF monitor 316 monitors all activities and events on the DU platform 326.

In some embodiments, the one or more APIs associated with the PRF SDK 308A-B consists of, but not limited to, a rw_call_next function that specifies the next task to be executed, a rw_wait_task function, that allows a task to block until completion of another task specified with rw_call_next, a rw_wait_signal that enables a task to wait until input data is available. The rw_call_next_inst function, similar to rw_call_next but expected to be used in a for loop so as to create multiple instances of the same task in case of parallel processing of different data streams, rw_wait_task_all function which allows a task to block until more than one sub tasks are completed, rw_get_caller_task_id which retrieve the id of the caller task i.e the task (function) which did a rw_call_next to this particular task, a rw_get_arg_pt that extracts the actual data to be processed by the current task from the rw_task_arg structure. The input argument of each RAN task is of type rw_task_arg and the programmer has to use rw_get_arg_ptr to extract the actual data to be processed by the task; and an rw_alloc_task_arg that creates a structure of type rw_task_arg from the actual data that is being processed by the current task. Each RAN task requires its input argument to be of type rw_task_arg*. Thus, the current task needs to create an rw_task_arg structure to be able to pass it as an argument to rw_call_next.

In some embodiments herein, the PRF SDKs 308A-B include a TASK_START and TASK_END macros. The main execution action in any given task is to be wrapped by these macros.

In some embodiments, the API rw_call_next takes the name of the task as an argument along with the corresponding task argument structure and returns the task_id. The task corresponding to the task name is expected to be implemented as a C function. The rw_call_next (is a non-blocking API. The PFG runtime unit 314 schedules the specified task for execution and immediately return. In case there is a need to wait for the call_next task to be completed, then the rw_wait_task( ) API should be used.

In some embodiments, the API rw_wait_task (uint32_t task_id, is invoked to wait until the task corresponding to task_id completes its execution. The API rw_wait_task( ) is used in case of explicit dependencies between call_next of one or more tasks.

In some embodiments, the API rw_wait_signal (uint32_t task_id, present inside a task, will wait until the data is available for processing. Typically, every task will have its processing logic implemented as given below:

```
void demo_task (rw_task_arg *t_args) {
TASK_START
rw_wait_signal( );
/* all the processing */
TASK_END
}
```

In some embodiments, the API rw_call_next_inst(char *char_name, void *rw_task_arg, uint32_t inst_id) is similar to the API rw_call_next( ) and is expected to be used in a for loop when multiple instances of the same task need to be created as shown below:

```
void demo_task(rw_task_arg *t_args) {
demo_inp_struct*inp_data=rw_get_arg_ptr(t_args);
. . .
rw_task_arg *pargs[NUM_INSTS];
p_data *pd[NUM_INSTS];
. . .
pargs=rw_alloc_task_arg(NUM_INSTS, size_of(p_data);
for (i=0; i<NUM_INSTS; i++)
pd[i]=rw_get_arg_ptr(pargs[i]);
TASK_START
rw_wait_signal(caller_task_id):
. . .
for (i=0; i<NUM_INSTS; i++) {
/* perform all the processing */
t_id=rw_call_next_inst(p_task, p_args, i);
}
TASK_END
}
```

In some embodiments, the API rw_call_next_inst (char *char_name, void *rw_task_arg, uint32_t inst_id) can only be used inside a for loop. Further, the API rw_wait_task( ) cannot be used immediately after rw_call_next_inst( ) to wait for completion of a task instance created using rw_call_next_inst( ). The developer tool 210 may error out in both the cases.

In some embodiments, the API rw_wait_task_all(uint32_t task_count, uint32_t task_ids[ ]) is similar to rw_wait_task( ), however allows blocking of RAN tasks until more than one task is completed. Further, the API waits until the task_count number of tasks is completed. The task id of each of these tasks is passed in the second argument task_ids which is an array of all the task identifiers, as shown below:

```
void demo_task(rw_task_arg *t_args) {
TASK_START
rw_wait_signal( );
. . .
for (i=0; i<3; i++) {
t_ids[i]=rw_call_next_inst(p_task, p_args[i], i);
}
rw_wait_task_all[3, t_ids);
TASK_END
}
```

In some embodiments, the API rw_alloc_task_arg (uint32_t count, uint32_t size), returns a pointer to rw_task_arg type. The rw_task_arg data type consists of two parts, firstly metadata required by the software development kit framework to manage the tasks and a pointer to the actual data that will be processed in the task. In some embodiments, the two arguments passed to this API include (i) a count indicating the number of instances of rw_task_arg that should be allocated. It is typically expected to be 1 except when used in conjunction with rw_call_next_inst( ) and (ii) a size indicating the size of the actual data that will be processed by a particular RAN task specified with rw_call_next( ) as shown below:

```
void demo_task(rw_task_arg *t_args) {
demo_inp_struct*inp_data=rw_get_arg_ptr(t_args);
. . .
rw_task_arg *p_arg;
p_data *pd;
. . .
p_arg=rw_alloc_task_arg(NUM_INSTS, size_of(p_data)
pd=rw_get_arg_ptr(pargs[i]);
TASK_START
   rw_wait_signal( ):
      /* perform all the processing of pd */
      t_id=rw_call_next_inst(p_task, p_args, i)
TASK_END
}
```

The developer is expected to use the API rw_alloc_task_arg to create the argument structure for any task that will be invoked using the rw_call_next 0 API.

In some embodiments, the API rw_get_arg_ptr(rw_task_arg *t_ptr), extracts the actual data to be processed by the current task from the rw_task_arg structure. Here all RAN tasks will receive rw_task_arg * as an argument and the developer will have to use rw_get_arg_ptr( ) API to extract the actual data to be processed by the task.

In some embodiments, the API rw_get_caller_task_id (rw_task_arg *t_arg) enables to retrieve in a RAN task, the task id of the task that called it using the rw_call_next ( ) API. Retrieving the task id of the caller is required to use rw_wait_signal( ), the API used to wait for arrival of the data.

The below given table is an example code illustrating the usage of the one or more APIs described above:

pack certain bookkeeping data along with the actual data that has to be processed by the task.

In some embodiments, the developer tool 210 is the tool used by the L1 physical software code developers to compile time checks to ensure the one or more APIs are used correctly in the C code and there are no inconsistencies or errors. The developer tool 210 further enables the developers to extract the data flow graph (DFG) 212 from the L1 code. This DFG 212 may be used by the schedule generator 214.

Figure 3B:
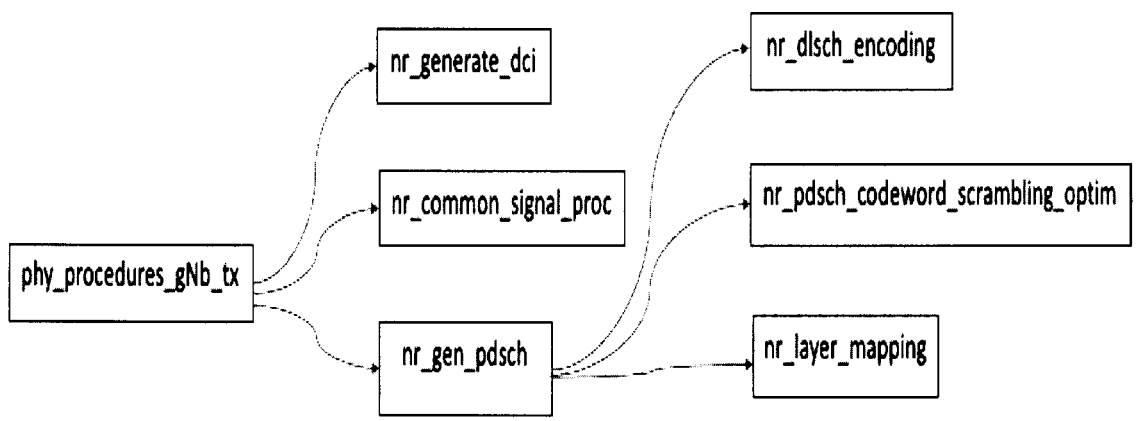
FIG. 3B is an example illustration of structure of a Data Flow Graph (DFG) that is extracted for L1 physical software codes according to some embodiments herein.

FIG. 3B is an example illustration of structure of the DFG 212 that is extracted for the L1 physical software codes 306A-B according to some embodiments herein. The functions of the components have been explained above.

```
/* top.c */
void gNb_L1_thread_tx(rw_task_arg *p_l1_arg) {
    /* get the actual structure that contains the information to be processed
     * by this task */
    gnb_l1_struct *p_l1_data = (gnb_l1_args *)rw_get_arg_ptr(p_l1_args);
    /* retrieve the task id of the caller to wait for data */
    rw_task_id t_id = rw_get_caller_task_id(p_l1_args);
    rw_task_id phy_proc_id = 0;
    /* allocate memory for the next that will be called */
    rw_task_arg *p_phy_arg = rw_alloc_task_arg(1, sizeof(phy_proc_gnb_tx_data);
    /* And get the actual struct that will contain the data for the next task */
    phy_proc_gnb_tx_data
        *p_phy_proc_gnb_tx = rw_get_arg_ptr(p_phy_arg);
    TASK_START
        rw_wait_signal(t_id);
        /* data processing */
        phy_proc_id = rw_call_next("phy_procedures_gNb_tx", p_phy_arg);
    TASK_END
    rw_wait_task(phy_proc_id);
}
/* phy_procedures.c */
void phy_procedures_gNb_tx(rw_task_arg *phy_proc_arg) {
    phy_proc_gnb_tx_data *phy_proc_gnb_tx =
        (phy_proc_gnb_tx_data*)rw_get_arg_ptr(phy_proc_arg);
    rw_task_id t_id = rw_get_caller_task_id(phy_prog_arg);
    rw_task_arg *p_dci_arg = rw_alloc_task_arg(1, sizeof(dci_data);
    dci_data *p_dci_data = rw_get_arg_ptr(p_dci_args);
    ...
    ...
    uint32_t sub_task_ids[3];
    ...
    TASK_START
        rw_wait_signal(t_id);
        ...
        sub_task_ids[0] = rw_call_next("nr_generate_dci", p_dci_args);
        /*nr_common_signal_proced */
        sub_task_ids[1] = rw_call_next("nr_common_signal_proc",
                p_nr_common_signal_args);
        sub_task_ids[2] = rw_call_next("nr_generate_pdsch", p_pdsch_args);
        rw_wait_task_all(3, sub_task_ids);
    TASK_END
}
/* nr_generate_pdsch.c */
    void nr_gen_pdsch(rw_task_arg *pdsch_args) {
        ...
        ...
        TASK_START
            wait_for_signal( ):
            ...
            dlsch_enc_id = rw_call_next("nr_dlsch_encoding", p_dlsch_enc_args);
            cdw_scrm_id =
                rw_call_next("nr_pdsch_codeword_scrambling_optim", p_codeword_args);
            nr_lmap_id = rw_call_next("nr_layer_mapping", p_layer_map_args);
        TASKEND
    }
```

As illustrated in the above code, the SDK 206 requires all the RAN tasks to have the same signature as given below:
void <task_name>(rw_task_arg *);
Most task management environments (pthread for example) require that a task/thread accept an argument of type void*. The rw_task_arg * type enables the sDK to also In some embodiments, the portable RAN framework 300 further includes a schedule generator 214 and a Hardware Architecture Description (HWAD) file 324 encompassed in an orchestration engine 322.

In some embodiments, the schedule generator 214 assigns each node in the DFG 212 generated by the developer to one or multiple processing elements (processor cores, DSP cores, etc.) of the DU accelerator platform. The schedule generator 214 analyses the HWAD file 324 of a DU platform 326 and performs sophisticated graph partitioning to identify the best possible schedule for all the tasks in the DFG 212, i.e., it assigns a PE(s) to each of the tasks. The schedule generator's 214 output is stored in as the HWAD file 324 that is used by a PRF runtime unit 314.

In some embodiments, the schedule generator 214 assigns the RAN tasks in the DFG 212 to the one or more processing elements 218A-N on a single chip in the DU platform 326 or across multiple chips within the same DU platform or across multiple DU platforms as well. The schedule generator 214 is a non-runtime tool and hence does not cause any runtime overheads. In some embodiments, the schedule generator 214 also analyse the timing constraints specified for each of the RAN tasks (node) in the DFG 212. The portable RAN framework 300 may enable the L1 software developer to specify these constraints as programs in the C source code or capture them in a simple timing constraints file.

In some embodiments, the Hardware Architecture Description (HWAD) file 324 enables description of all the important elements of the DU platform 326 such as the one or more processing elements 218A-N, their types (DSP, GPU, GPP), capabilities, memory hierarchy on the DU platform 326, etc. An example of the HWAD file 324 is as given below:

```
{
  Hw_config {
    m_vendor_id = "SLabs";
        /* vend id could be SLabs, Intel, Marvel, etc. */
    m_num_cards = "1";
    Card1 {
      m_num_chips = "1";
      Chip1 {
        GlobalMem{
          m_start = "0XAABBCCDD";
          m_end = "0XABABABAB";
        };
        m_num_proc_elems = "4";
        m_proc_elem_type = "DSP";
            /* proc elem could be eDSP, ex86, eGPU, eFPGA */
        ProcElem1{
          Proc_mem{
            m_data_mem = "0XBCADBCAD";
            m_prog_mem = "0XBCBCBCBC";
          };
          m_accel_type = "SPROC";
        };
        ...
        ...
        ...
        ProcElem4,
          Proc_mem {
            m-data_mem = "...";
            m_prog_mem = "0...";
          };
          m_accel_type = "SPROC";
        };
      ); /* end chip1 */
    ); /* end card1 */
  }; /* end hw config */
); /* end */
```

In some embodiments, the HWAD file 324 enables the schedule generator 214 to be portable to any DU platform as it enables the schedule generator 214 to provision the compute resources like PEs for the RAN tasks in the DFG 212 in a platform independent manner.

In some embodiments, the PRF runtime unit 314 contains the runtime implementation of the SDK APIs and also consists of the runtime scheduler implementation. This unit is linked with the object files generated after compilation of the L1 C code to produce the final L1 implementation. As a part of one-time initialization, the scheduler runtime unit 216 reads the output generated by the schedule generator 214 and loads the RAN tasks on the identified processing element before starting the L1 execution from the first task in the DFG 212. Since the loading of the RAN tasks is done only once per RAN CNF instantiation and is performed before actual task execution starts, it does not result in any runtime overheads.

In some embodiments, the RAN monitor monitors all the activities and events on the DU hardware platform like power consumption, resource utilization on the DU hardware platform, and the like.

In some embodiments, the SDK uses the one or more platform drivers 318 to communicate with the DU accelerator platforms. Thus, the schedule generator 214 may require one or more platform drivers 318 (typically a PCIe end-point driver) to communicate with the DU platform 326.

In some embodiments, the user interface 204 executes on a CNF manager and provisions deployment of L1 software, visualization of the DFG 212 extracted by the developer tool 210 from the L1 application code, invocation of the schedule generator 214, and view the partitioning of different RAN tasks on the processor elements of the DU platform 326 and visualization of performance, memory utilization and various other metrics gathered by the PRF monitor 316 during the execution of the L1 software.

Figure 4:
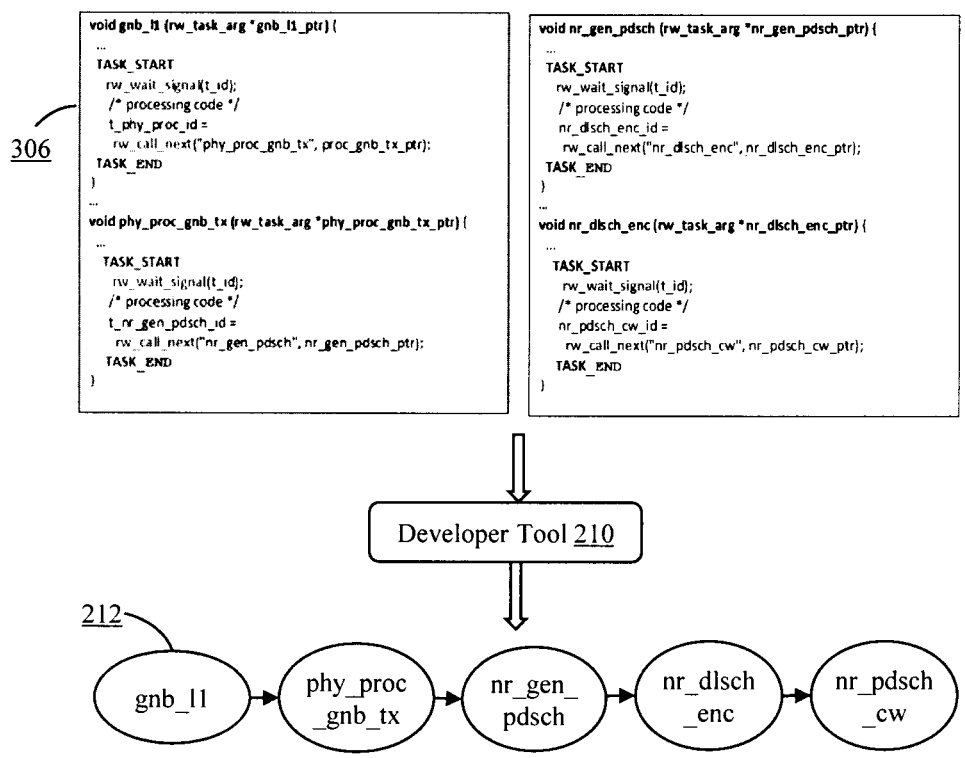
FIG. 4 is a schematic representation deployment of Radio Access Network Containerized Network Functions (RAN CNFs) that are portable across one or more RAN hardware platforms, according to some embodiments herein.

FIG. 4 is an example illustration of extraction of Data Flow Graphs (DFGs), according to some embodiments herein. The RAN tasks are developed as C functions. The SDK provides one or more APIs which allows the software developers to express the RAN tasks as a pipeline or as the DFG 212. The developer then extracts the Data flow Graph (DFG) 212 from the L1 physical software codes 306A-B. These extracted DFGs 212 are used by the schedule generator 214 to generate a schedule for the RAN tasks.

Figure 5:
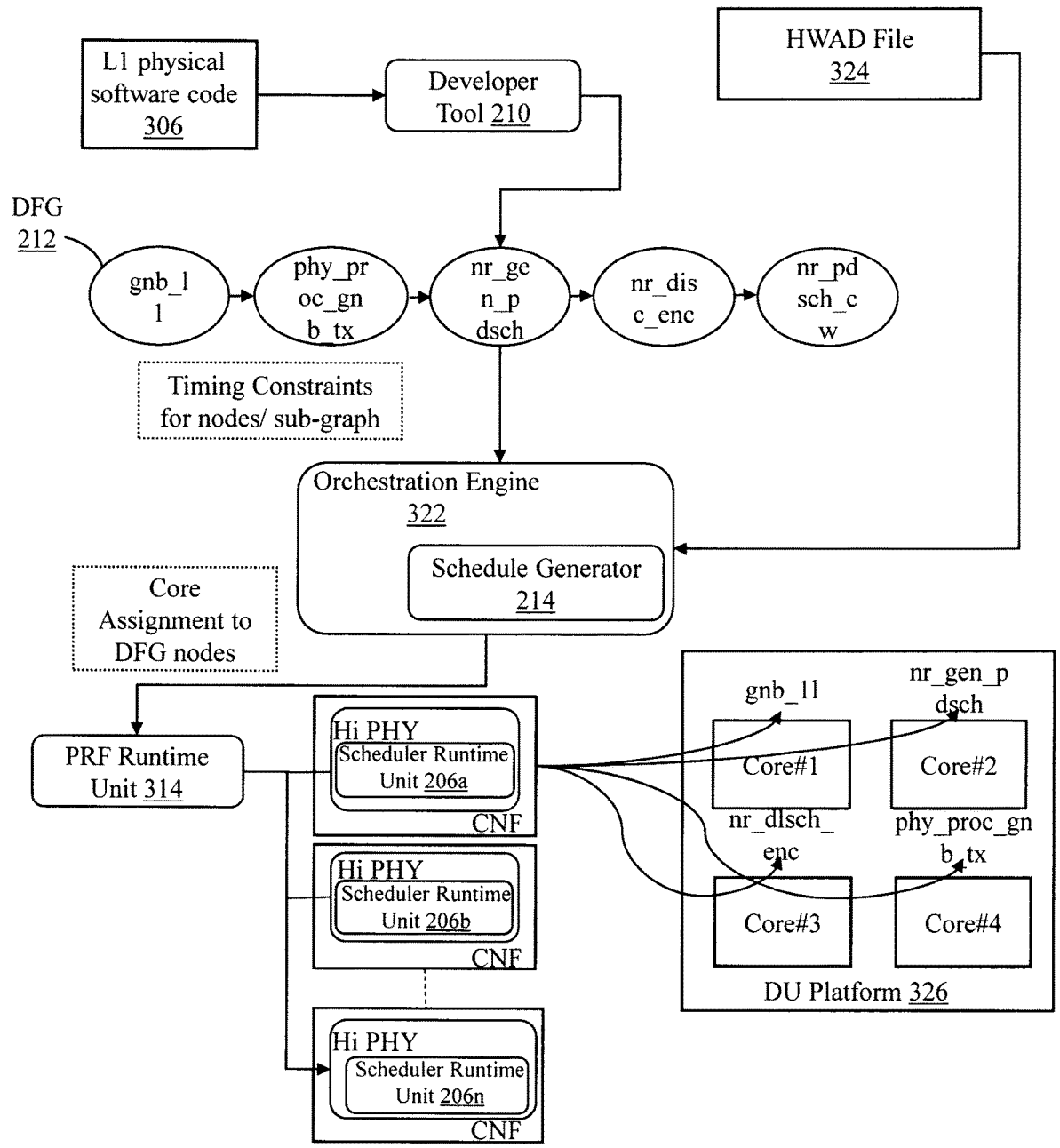
FIG. 5 is an example illustration of extraction of Data Flow Graphs (DFGs), according to some embodiments herein.

FIG. 5 is a schematic representation deployment of Radio Access Network Containerized Network Functions (RAN CNFs) that are portable across one or more RAN hardware platforms, according to some embodiments herein. The RAN SDK 206 enables developers to develop platform independent L1 physical software codes 306A-B. The developer tool 210 then extracts a Data Flow Graph 214 from the L1 physical software codes 306A-B. The schedule generator 214 then schedules the DFG 212 on the one or more processing elements 218A-N of the DU platform 326 and uses the HWAD file 324 for abstracting the underlying system hardware details like the one or more processing elements 218A-N, memory hierarchies, and the like. The PRF monitor 316 monitors all activities and events on the DU platform 326.

In some embodiments, the developer tool 210 is used to compile time checks to ensure the correct usage of the one or more the APIs 208A-N and to integrate the developer tool 210 with the existing software build system. For analysing the L1 physical software codes 306A-B, the developer tool 210 needs to be aware of the complier options being used by the developer to compile the L1 physical software codes 306A-B. For example, the -D option used to specify the macro definitions as well as the -I option used to specify the path include different files. Since most L1 software systems use a CMake or make-based build systems, the developer tool 210 has to be appropriately integrated with the specific build system being used for the development of L1 software.

This ensures that no additional effort is required for creating the input required for usage of the developer tool 210.

Figure 6A:
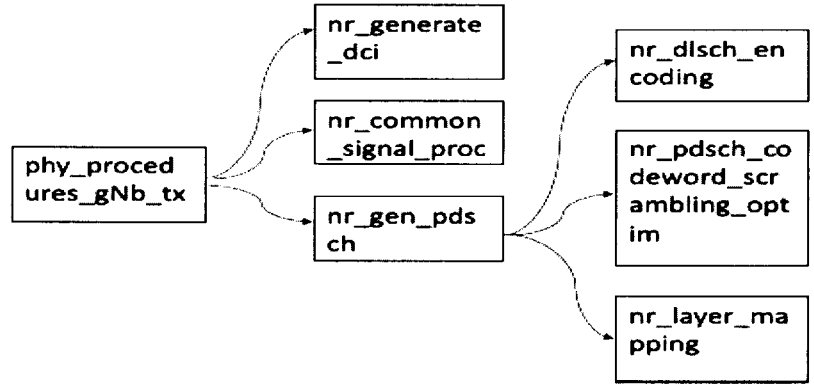
FIGS. 6A-6C are example illustrations of GUI loading the extracted DFGs corresponding to the L1 software, according to some embodiments herein.
Figure 6B:
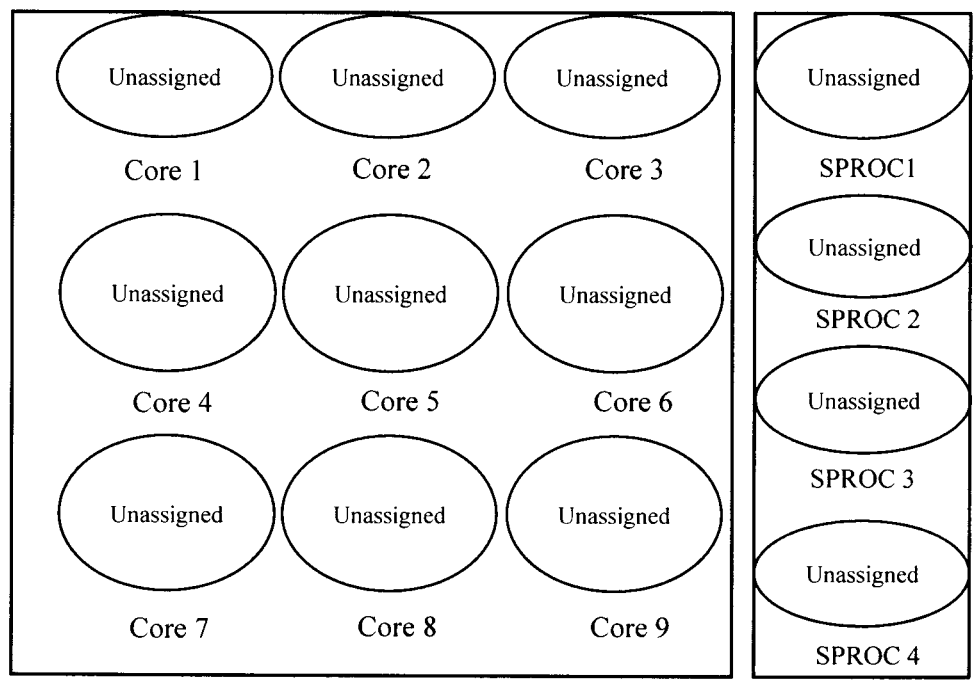
Figure 6C:
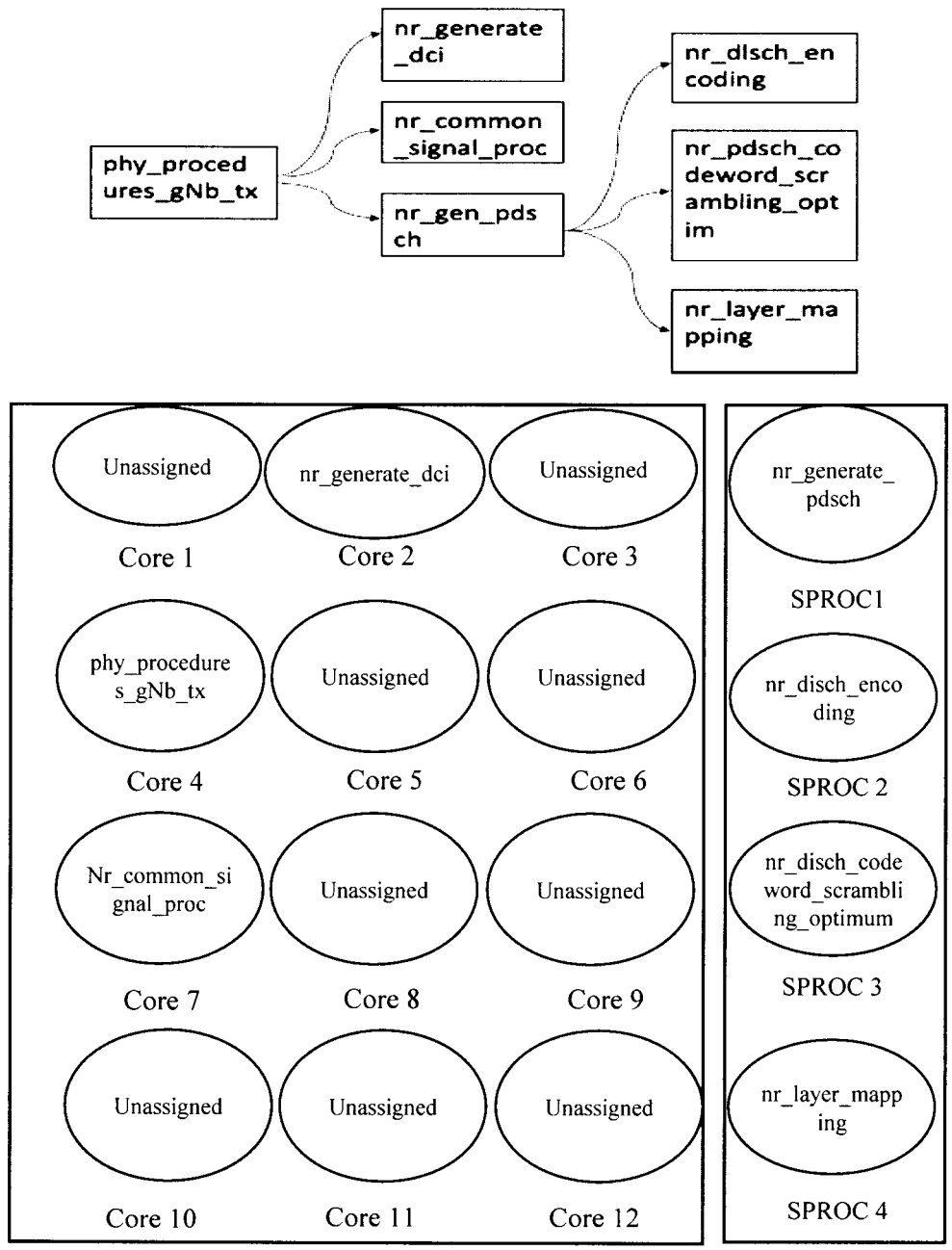

FIGS. 6A-6C are example illustrations of User Interface loading the extracted DFGs corresponding to the L1 software, according to some embodiments herein. FIG. 6A is an example of extracting the DFGs 212 for the C code. The L1 software systems use a C make or make-based build system and the developer tool 210 is appropriately integrated with the specific build system being used for L1 software development. This ensures that no additional efforts are required for creating the input required for using the developer tool 210.

FIG. 6B is an example illustrating the DFGs displayed by the user interface 204. The user instructs the user interface 204 to load the DFG 212 corresponding to the L1 software. The user interface 204 graphically displays the DFG 212 as shown in FIG. 6B. FIG. 6C is an example illustrating the DU hardware platform displayed on the user interface 204, according to some embodiments herein. The user interface 204 based on the user instructions reads the HWAD file 324 for the DU platform 326 and displays the details.

In some embodiments, the existing DPDK framework is used for data transfer to SL or any other accelerator hardware. DPDK provides user space APIs and most look-aside accelerators provide DPPDK support and the developer tool 210 may reuse the APIs. In some embodiments, the user associates timing constraints with each node in the DFG extracted by the developer tool 210. Further, each processing element specified in the HWAD file 324 will have a cost function associated with it. The cost function indicates that a work-load of a certain type may take n cycles to execute. The cost function is provided for all types of processing elements such as GPP, DSPs, FPGA accelerators, etc. In some embodiments, the schedule generator 214 analyses the timing constraints of each node in the DFG 212 and the cost functions for each PE. The schedule generator 214 also analyses the existing memory utilization and performance loads on all of the Pes. Additionally, there may be some other explicit scheduling policies provided to the schedule generator 214. The schedule generator 214 may assign the PEs to each of the nodes in the DFG 212 based on the above considerations.

In some embodiments, the node in the DFG 212 is very different from other RAN tasks and will be explicitly indicated by the user. The HWAD file 324 will have the FEC tile details as well. This will enable the schedule generator 214 to map an FEC task to a FEC tile.

In some embodiments, the task that is a part of the modem DFG should not have a system call. The developer tool 210 reports this as an error while it analyses the code to extract the DFG 212. Ideally, the users should only use the SDK APIs.

Figure 7:
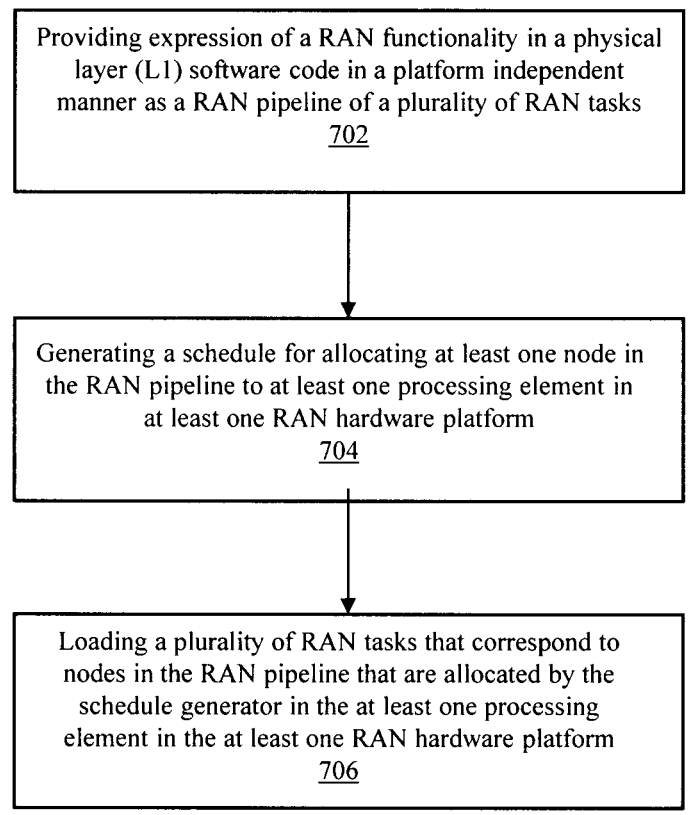
FIG. 7 is a flow diagram that illustrates a method of deploying a Radio Access Network Containerized Network Function (RAN CNF) that is portable across one or more RAN hardware platforms, according to some embodiments herein.

FIG. 7 is a flow diagram that illustrates a method of deploying a Radio Access Network Containerized Network Function (RAN CNF) that is portable across one or more RAN hardware platforms, according to some embodiments herein. At step 702, an expression of a RAN functionality in a physical layer (L1) software code in a platform-independent manner as a RAN pipeline of one or more RAN tasks is provided. At step 704, a schedule for allocating at least one node in the RAN pipeline to the one or more processing elements 218A-N in at least one RAN hardware platform is generated. At step 706, one or more RAN tasks that correspond to nodes in the RAN pipeline that are allocated by the schedule generator 214 is loaded in the one or more processing elements 218A-N in the at least one RAN hardware platform. The at least one RAN hardware platform is selected from the one or more RAN hardware platforms based on the schedule generated by the schedule generator 214.

In some embodiments, the method includes providing the developer tool 210 configured for extracting the DFG 212 from the physical layer (L1) software code and providing the DFG 212 as an input to the schedule generator 214 for scheduling the DFG 212 on a target RAN hardware platform.

In some embodiments, the method includes providing a Hardware Architecture Description (HWAD) file configured for providing a description of the one or more processing elements for provisioning computing resources for execution of the RAN tasks in the DFG 212 in a platform independent manner.

In some embodiments, the method includes providing a User Interface (UI) module configured for invoking the schedule generator 214 to schedule the tasks corresponding to network functions on at least one device driver.

The embodiments herein may include a computer program product configured to include a pre-configured set of instructions, which when performed, can result in actions as stated in conjunction with the methods described above. In an example, the pre-configured set of instructions can be stored on a tangible non-transitory computer-readable medium or a program storage device. In an example, the tangible non-transitory computer-readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

A representative hardware environment for practicing the embodiments herein is depicted in FIG. 8, with reference to FIGS. 2 through 7. This schematic drawing illustrates a hardware configuration of the computing device 301 in accordance with the embodiments herein. The computing device 301 includes at least one processing device 10. The special-purpose CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The computing device 301 can read the inventive instructions on the program storage devices and follow these instructions to execute the methodology of the embodiments herein. The computing device 301 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system including a processor for developing and deploying a Radio Access Network Containerized Network Function (RAN CNF) that is portable across a plurality of RAN hardware platforms, the system comprising:
    a Software Development Kit (SDK) that enables an expression of a RAN functionality in a physical layer software code in a platform independent manner as a RAN pipeline of a plurality of RAN tasks that comprise at least a first RAN task, and a second RAN task that is to be executed next in order to the first RAN task, wherein the first RAN task is developed as a function that invokes an Application programming interface (API) from a plurality of Application Programming Interfaces (APIs) to initiate a call to the second RAN task;
    a schedule generator configured for generating a schedule for allocating at least one node in the RAN pipeline to at least one processing element in at least one RAN hardware platform selected from the plurality of RAN hardware platforms; and
    a scheduler runtime unit configured for loading the plurality of RAN tasks that correspond to nodes in the RAN pipeline that are allocated by the schedule generator, in the at least one processing element in the at least one RAN hardware platform that is selected from the plurality of RAN hardware platforms based on the schedule generated by the schedule generator.

2. The system of claim 1, wherein the RAN pipeline comprises a Data Flow Graph (DFG), wherein the system comprises a developer tool configured for:
    extracting the DFG from the physical layer software code; and
    providing the DFG as an input to the schedule generator for scheduling the nodes in the RAN pipeline of the DFG on the at least one processing element of the at least one RAN hardware platform.

3. The system of claim 1, wherein the plurality of APIs comprises:
    a rw_call_next function which specifies a next RAN task to be executed;
    a rw_wait_task function which allows a RAN task to be blocked until completion of another RAN task specified with a task id from the rw_call_next function; and
    a rw_wait_task all function which allows the RAN task to be blocked until a plurality of sub-tasks are completed.

4. The system of claim 3, wherein the rw_call_next function is configured for:
    obtaining the task_id of the RAN task to be executed by providing the RAN task's name as an argument along with a corresponding task argument structure, wherein the rw_call_next function is implemented using a Remote Procedure Call (RPC) mechanism to transfer messages between the plurality of RAN tasks that are loaded on the at least one processing element.

5. The system of claim 3, wherein the rw_call_next function is configured for:
    obtaining the task_id of the RAN task to be executed by providing the RAN task's name as an argument along with a corresponding task argument structure, wherein the rw_call_next function is implemented using an Inter-process communication (IPC) mechanism to transfer messages between the plurality of RAN tasks that are loaded on the at least one processing element.

6. The system of claim 3, wherein the rw_call_next function is configured for:
    obtaining the task_id of the RAN task to be executed by providing the RAN task's name as an argument along with a corresponding task argument structure, wherein the rw_call_next function is implemented using at least one thread or task or process execution model provided by a runtime environment to execute plurality of RAN tasks that are loaded on the at least one processing element, wherein the runtime environment comprising a POSIX thread execution model or a Linux/UNIX process execution model.

7. The system of claim 3, wherein the rw_call_next function is configured for:
    obtaining the task_id of the RAN task to be executed by providing the RAN task's name as an argument along with a corresponding task argument structure, wherein the rw_call_next function is custom implemented to transfer messages between the plurality of RAN tasks that are loaded on the at least one processing element.

8. The system of claim 3, wherein the rw_wait_task function is configured for:
    queuing of a plurality of succeeding RAN tasks until execution of the RAN task corresponding to a task identifier, task_id is completed, wherein the rw_wait_task function is invoked during explicit dependencies between a rw_call_next function of the plurality of RAN tasks.

9. The system of claim 3, wherein the rw_wait_task_all function is configured for:
blocking a plurality of succeeding tasks until execution of a pre-set number of RAN tasks are completed, wherein a task_id of each of the tasks in execution is passed in a second argument task_ids which is an array of task identifiers.

10. The system of claim 1, wherein the plurality of APIs comprises:
a rw_alloc_task_arg function that enables a code developer to create an argument structure rw_task_arg for any task that will be invoked using the rw_call_next function, wherein the argument structure rw_task_arg comprises metadata required by a developer tool to manage the plurality of RAN tasks and a pointer to a actual data being processing in a RAN task.

11. The system of claim 7, wherein the plurality of APIs comprises:
a rw_get_arg_ptr(rw_task_arg *t_ptr) function that enables a code developer to extract data from the argument structure, rw_task_arg, to be processed by the plurality of RAN tasks; and
a rw_get_caller_task_id(rw_task_arg *t_arg) function that enables retrieval of a task id of the RAN task that received arg as an argument.

12. The system of claim 2, wherein the system comprises a Hardware Architecture Description (HWAD) file for providing a description of the at least one processing element for provisioning computing resources for execution of the plurality of RAN tasks in the DFG in a platform independent manner.

13. The system of claim 2, wherein the system comprises a User Interface (UI) module configured for invoking the schedule generator to schedule the plurality of RAN tasks corresponding to network functions on the at least one processing element, wherein the UI module comprises a first window comprising the DFG and a second window comprising a schedule of the plurality of RAN tasks.

14. A method for developing and deploying a Radio Access Network Containerized Network Function (RAN CNF) that is portable across a plurality of RAN hardware platforms, comprising:
enabling, by a Software Development Kit (SDK), an expression of a RAN functionality in a physical layer software code in a platform independent manner as a RAN pipeline of a plurality of RAN tasks that comprise at least a first RAN task, and a second RAN task that is to be executed next in order to the first RAN task, wherein the first RAN task is developed as a function that invokes an Application programming interface (API) from a plurality of Application Programming Interfaces (APIs) to initiate a call to the second RAN task;
generating, by a schedule generator, a schedule for allocating at least one node in the RAN pipeline to at least one processing element in at least one RAN hardware platform selected from the plurality of RAN hardware platforms; and
loading, by a scheduler runtime unit, the plurality of RAN tasks that correspond to nodes in the RAN pipeline that are allocated by the schedule generator, in the at least one processing element in the at least one RAN hardware platform that is selected from the plurality of RAN hardware platforms based on the schedule generated by the schedule generator.

15. The method of claim 14, wherein the RAN pipeline comprises a Data Flow Graph (DFG), wherein the method comprises providing a developer tool configured for:
extracting the DFG from the physical layer software code; and
providing the DFG as an input to the schedule generator for scheduling the nodes in the RAN pipeline of the DFG on the at least one processing element of the at least one RAN hardware platform.

16. The method of claim 14, wherein the plurality of APIs comprises:
a rw_call_next function which specifies a next RAN task to be executed;
a rw_wait_task function which allows a RAN task to be blocked until completion of another RAN task specified with a task_id from the rw_call_next function; and
a rw wait task all function which allows the RAN task to blocked until a plurality of sub-tasks are completed.

17. The method of claim 16, wherein the rw_call_next function is configured for:
obtaining the task_id of the RAN task to be executed by providing the RAN task's name as an argument along with a corresponding task argument structure, wherein the rw_call_next function is implemented using a Remote Procedure Call (RPC) mechanism to transfer messages between the plurality of RAN tasks that are loaded on the at least one processing element.

18. The method of claim 16, wherein the rw_call_next function is configured for:
obtaining the task_id of the RAN task to be executed by providing the RAN task's name as an argument along with a corresponding task argument structure, wherein the rw_call_next function is implemented using an Inter-process communication (IPC) mechanism to transfer messages between the plurality of RAN tasks that are loaded on the at least one processing element.

19. The method of claim 16, wherein the rw_call_next function is configured for:
obtaining the task_id of the RAN task to be executed by providing the RAN task's name as an argument along with a corresponding task argument structure, wherein the rw_call_next function is implemented using at least one thread or task or process execution model provided by a runtime environment to execute the plurality of RAN tasks that are loaded on the at least one processing element, wherein the runtime environment comprising a POSIX thread execution model or a Linux/UNIX process execution model.

20. The method of claim 16, wherein the rw_call_next function is configured for:
obtaining the task_id of the RAN task to be executed by providing the RAN task's name as an argument along with a corresponding task argument structure, wherein the rw_call_next function is custom implemented to transfer messages between the plurality of RAN tasks that are loaded on the at least one processing element.

21. The method of claim 16, wherein the rw_wait_task function is configured for:
queuing of a plurality of succeeding RAN tasks until execution of the RAN task corresponding to a task identifier, task_id is completed, wherein the rw_wait_task function is invoked during explicit dependencies between a rw_call_next function of the plurality of RAN tasks.

22. The method of claim 14, wherein the rw_wait_task all function is configured for:
blocking the plurality of succeeding tasks until execution of a pre-set number of RAN tasks are completed, wherein a task_id of each of the tasks in execution is passed in a second argument task_ids which is an array of task identifiers.

23. The method of claim 14, wherein the plurality of APIs further comprises:
a rw_alloc_task_arg function that enables a code developer to create an argument structure rw_task_arg for any task that will be invoked using the rw_call_next function, wherein the argument structure rw_task_arg comprises meta data required by a developer tool to manage the plurality of RAN tasks and a pointer to the actual data being processing in a RAN task.

24. The method of claim 14, wherein the plurality of APIs further comprises:
a rw_get_arg_ptr (rw_task_arg *t_ptr) function that enables a code developer to extract data from the argument structure, rw_task_arg to be processed by the plurality of RAN tasks; and
a rw_get_caller_task_id (rw_task_arg *t_arg) function that enables retrieval of a task_id of the RAN task that received arg as an argument.

25. The method of claim 15, further comprising providing a Hardware Architecture Description (HWAD) file configured for providing a description of the at least one processing element for provisioning computing resources for execution of the plurality of RAN tasks in the DFG in a platform independent manner.

26. The method of claim 15, further comprising providing a User Interface (UI) module configured for invoking the schedule generator to schedule the plurality of RAN tasks corresponding to network functions on the at least one processing element, wherein the UI module comprises a first window comprising the DFG and a second window comprising a schedule of the plurality of RAN tasks.

* * * * *